Figure 3:
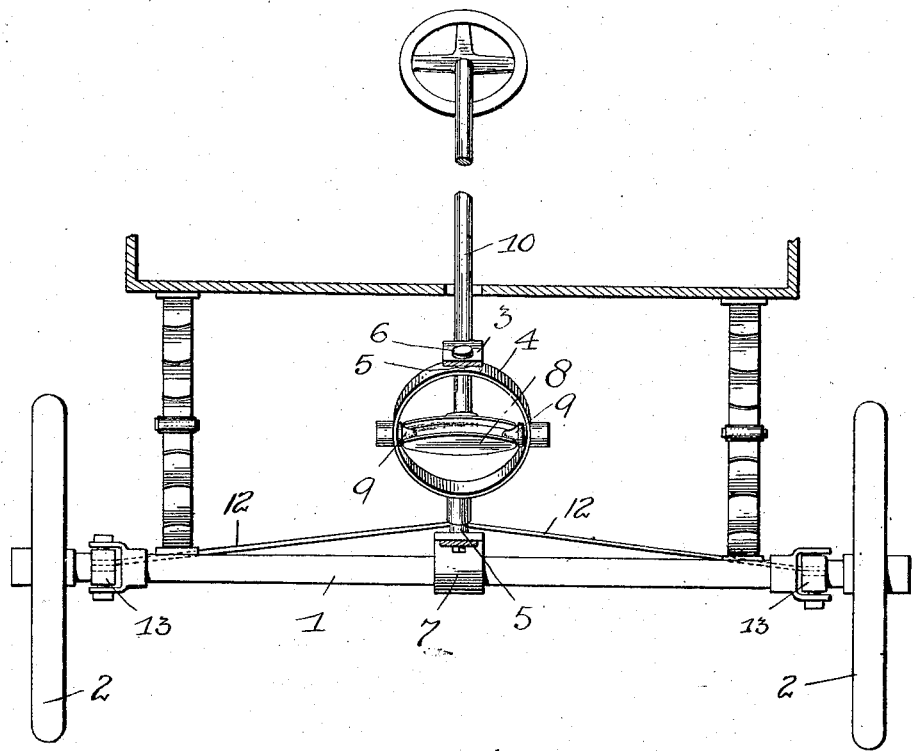

No. 867,290. PATENTED OCT. 1, 1907.
M. A. McENTIRE.
STEERING GEAR.
APPLICATION FILED JULY 1, 1907.
2 SHEETS—SHEET 1.
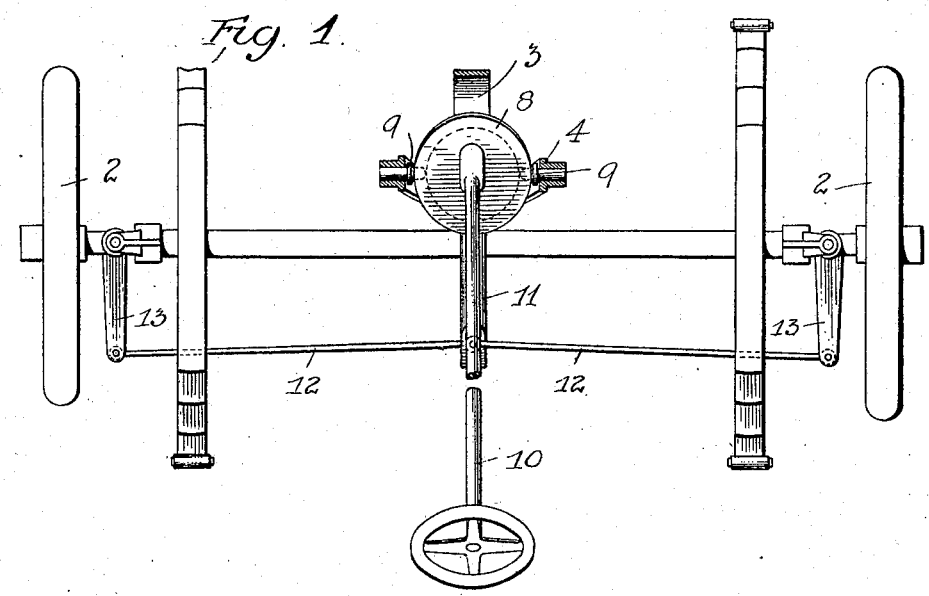
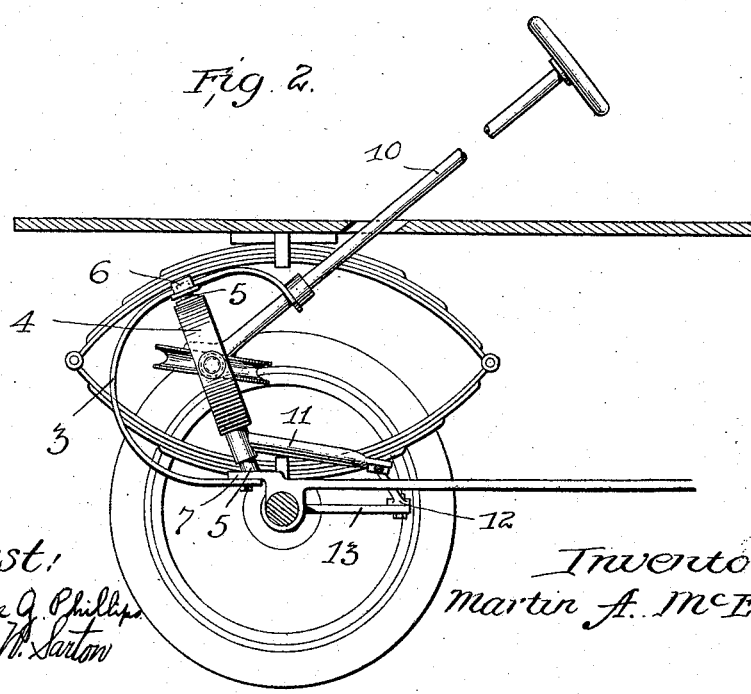
Attest:
Beatrice G. Phillips
Edward W. Sarton
Inventor
Martin A. McEntire.
by Spear Middleton Donaldson & Spear
Atty's.

No. 867,290. PATENTED OCT. 1, 1907.
M. A. McENTIRE.
STEERING GEAR.
APPLICATION FILED JULY 1, 1907.

2 SHEETS—SHEET 2.

Attest:
Beatrice J. Phillips.
Edward W. Sarton

Inventor
Martin A. McEntire

By Spear Middleton Donaldson Spear
Atty's.

UNITED STATES PATENT OFFICE.

MARTIN A. McENTIRE, OF ASHLAND, OHIO.

STEERING-GEAR.

No. 867,290.　　　　　Specification of Letters Patent.　　　　　Patented Oct. 1, 1907.

Application filed July 1, 1907. Serial No. 381,648.

*To all whom it may concern:*

Be it known that I, MARTIN A. MCENTIRE, a citizen of the United States, residing at Ashland, Ohio, have invented certain new and useful Improvements in Steering-Gear, of which the following is a specification.

My invention has for its object the production of a steering device for motor vehicles which shall be of simple construction and of great durability and efficiency and the invention includes the features of construction and arrangement and combination of parts hereinafter described and particularly set forth in the appended claims.

The invention is illustrated in the accompanying drawing, in which,—
Figure 1 is a plan view of the front axle and steering wheels of a motor vehicle and a portion of the frame, with the invention applied thereto. Fig. 2 is a side elevation, and Fig. 3 is a front view.

Referring by reference characters to these figures, the numeral 1 designates the front axle, 2—2 the steering wheels, and 3 a portion of the frame or running gear on which the steering mechanism is mounted. In this frame is pivotally mounted a vertical ring 4 on lower trunnions 5 suitably journaled in the bearings 6 and 7.
Within this ring is located a disk 8 having a grooved edge into which extend projections 9 located on opposite sides of the ring and which projections preferably carry anti-friction rollers to reduce friction.

The steering rod 10 is rigidly connected to the rear or upper face of the disk 8 and extends upward and rearward at an oblique angle thereto, being suitably journaled in the frame and extending through an opening in the floor of the body, and provided at its upper end with a hand wheel or like device for conveniently turning it.

The ring 4 is provided with a rearwardly extending bracket or arm 11 which is connected by links 12 to the arms 13 of the usual angle levers by which the steering wheels are pivotally connected to the ends of the axles.

From the above description it will be seen that I provide a very simple form of steering gear or mechanism, of few parts, not likely to get out of order, and capable of being easily manipulated.

The operation will be obvious as it will be seen that upon the turning of the steering rod the disk will be turned and through the projections and groove connection between the disk and ring cause the latter to be rotated, swinging with it the arm 11 and through the links 12 the angle levers carrying the steering wheels.

Having thus described my invention, what I claim is:—

1. In a steering mechanism for motor vehicles, a ring mounted to pivot on a substantially vertical axis, connections between the ring and steering wheels whereby the movement of the rings swings the latter, a circular member within the ring, projections on one of said parts engaging grooves in the other, and means for swinging the circular part, substantially as described.

2. In a steering mechanism for motor vehicles, a ring mounted to pivot on a substantially vertical axis, connections whereby the swinging of the ring swings the steering wheels, a grooved disk located within the ring, projections from the ring entering the grooves of the disk, and a steering rod secured to the disk at an oblique angle thereto, substantially as described.

In testimony whereof, I affix my signature in presence of two witnesses.

MARTIN A. MCENTIRE.

Witnesses:
　J. C. SLOAN,
　P. F. SHARICK.